(12) United States Patent
Klisky et al.

(10) Patent No.: US 11,919,618 B2
(45) Date of Patent: Mar. 5, 2024

(54) AIRCRAFT PRESSURIZED CABIN DOOR WITH A STRUCTURE FORMED BY BEAMS HAVING A VARYING CROSS-SECTION

(71) Applicant: LATECOERE, Toulouse (FR)

(72) Inventors: Miloslav Klisky, Prague (CZ); Jean Michel Borlot, Teulat (FR); Josef Krena, Lysa Nad Labem (CZ)

(73) Assignee: LATECOERE, Toulouse (FR)

(*) Notice: Subject to any disclaimer, the term of this patent is extended or adjusted under 35 U.S.C. 154(b) by 0 days.

(21) Appl. No.: 17/756,666

(22) PCT Filed: Nov. 30, 2020

(86) PCT No.: PCT/EP2020/083831
§ 371 (c)(1),
(2) Date: May 31, 2022

(87) PCT Pub. No.: WO2021/110569
PCT Pub. Date: Jun. 10, 2021

(65) Prior Publication Data
US 2022/0411039 A1 Dec. 29, 2022

(30) Foreign Application Priority Data
Dec. 2, 2019 (FR) .................... FR1913588

(51) Int. Cl.
*B64C 1/14* (2006.01)
(52) U.S. Cl.
CPC .......... *B64C 1/1423* (2013.01); *B64C 1/1461* (2013.01)

(58) Field of Classification Search
CPC ........... B64C 1/06; B64C 1/061; B64C 1/064; B64C 1/065; B64C 1/068; B64C 1/069
See application file for complete search history.

(56) References Cited

U.S. PATENT DOCUMENTS

| | | | |
|---|---|---|---|
| 8,523,110 B2* | 9/2013 | Schwinning | B64C 1/1407 244/119 |
| 9,878,360 B2* | 1/2018 | Kubo | B21D 5/083 |
| 2007/0007390 A1* | 1/2007 | Doerer | B64C 1/1461 244/129.5 |
| 2009/0078826 A1 | 3/2009 | Haensch | |
| 2011/0115115 A1* | 5/2011 | Winter | B64C 3/182 425/365 |

(Continued)

FOREIGN PATENT DOCUMENTS

| | | |
|---|---|---|
| FR | 2888816 | 1/2007 |
| FR | 2928620 | 9/2009 |

*Primary Examiner* — Philip J Bonzell
*Assistant Examiner* — Cindi M Curry
(74) *Attorney, Agent, or Firm* — Defillo & Associates, Inc.; Evelyn A. Defillo

(57) ABSTRACT

An aircraft pressurized cabin door (1) having an outer panel (2) and a door structure (3) including: two circumferential beams (4) fastened to the lateral edges of the door; a plurality of longitudinal beams (5a, 5b) which are arranged substantially perpendicularly between the circumferential beams (4) and are fastened to the outer panel (2), each longitudinal beam (5a, 5b) extending from one circumferential beam (4) to the other. At least one longitudinal beam (5b) is a beam that has a variable cross-section which increases from the ends (B, M) of the beam to the center (H, L) of the beam, with two bent support bars.

7 Claims, 3 Drawing Sheets

(56) References Cited

U.S. PATENT DOCUMENTS

| | | | |
|---|---|---|---|
| 2011/0135886 A1* | 6/2011 | Winter | B29C 70/50 428/178 |
| 2012/0100343 A1* | 4/2012 | Borghini-Lilli | B29C 70/30 428/156 |
| 2014/0186572 A1 | 7/2014 | Arevalo | |
| 2015/0375843 A1* | 12/2015 | Griess | B64C 1/06 244/129.1 |
| 2016/0009355 A1* | 1/2016 | Jansen | B64C 3/182 428/157 |
| 2021/0086886 A1* | 3/2021 | Behzadpour | B29C 70/30 |

* cited by examiner

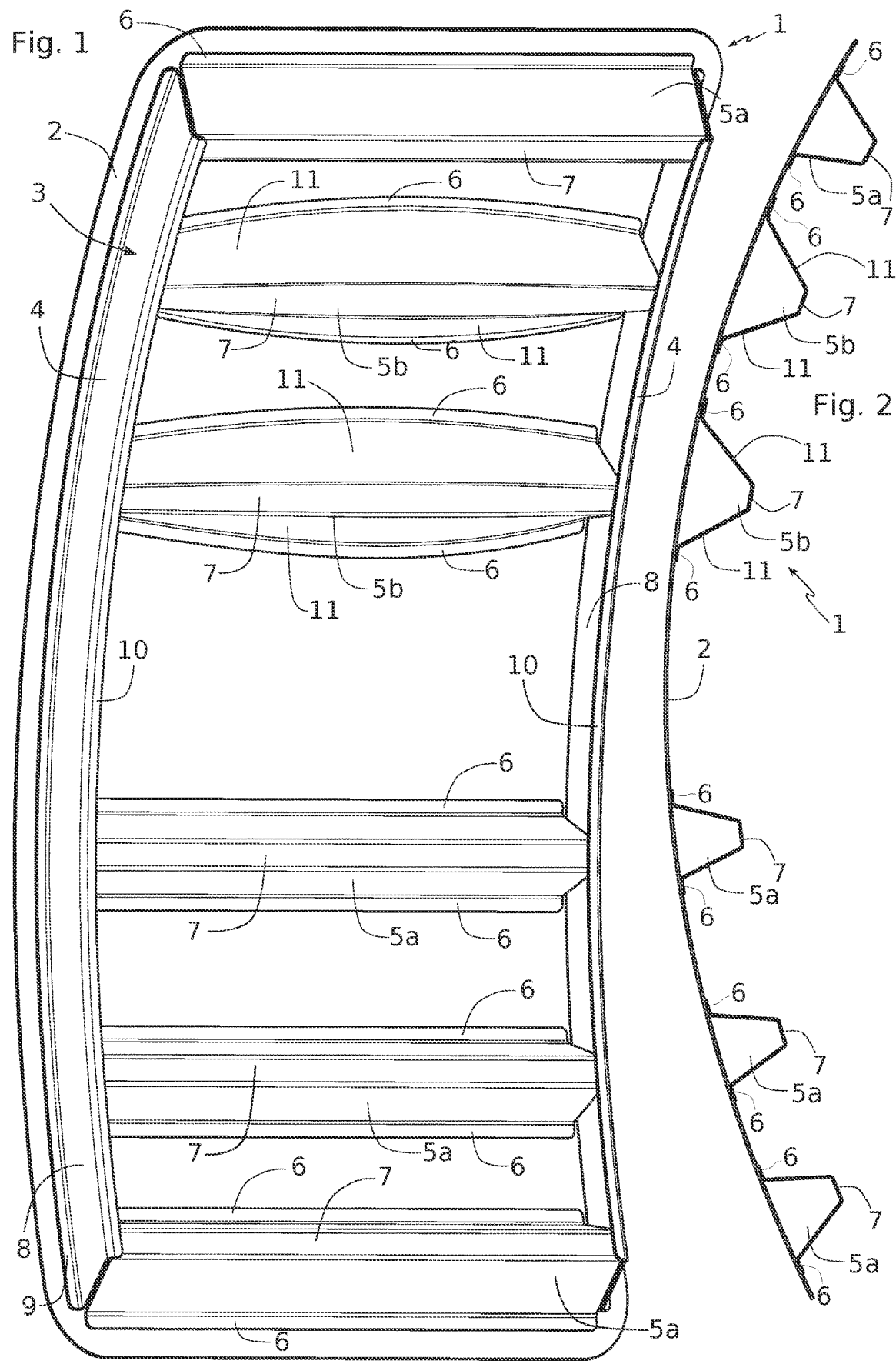

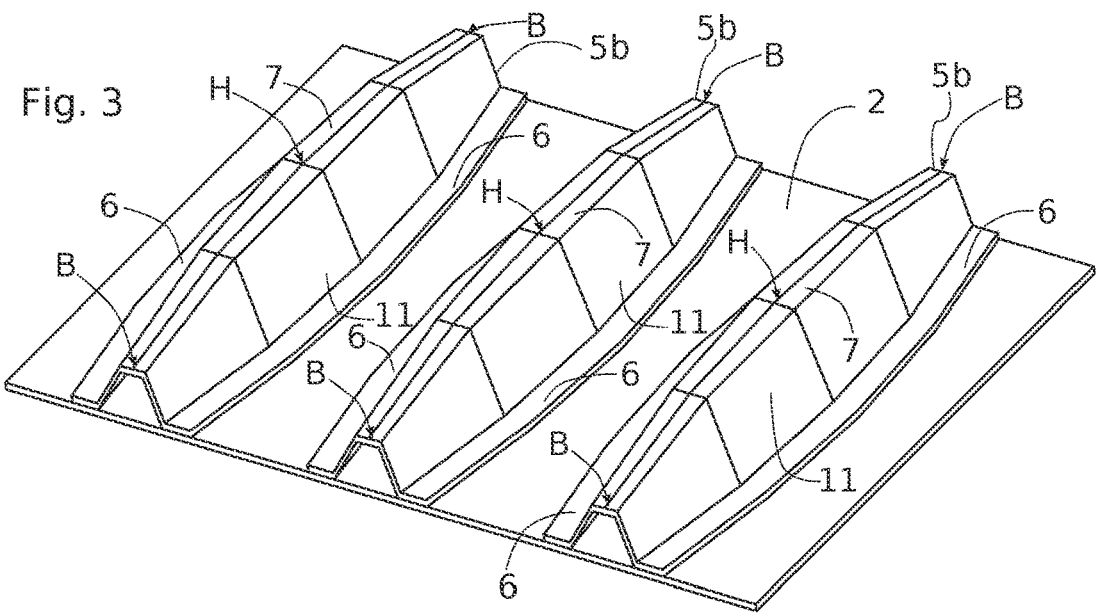
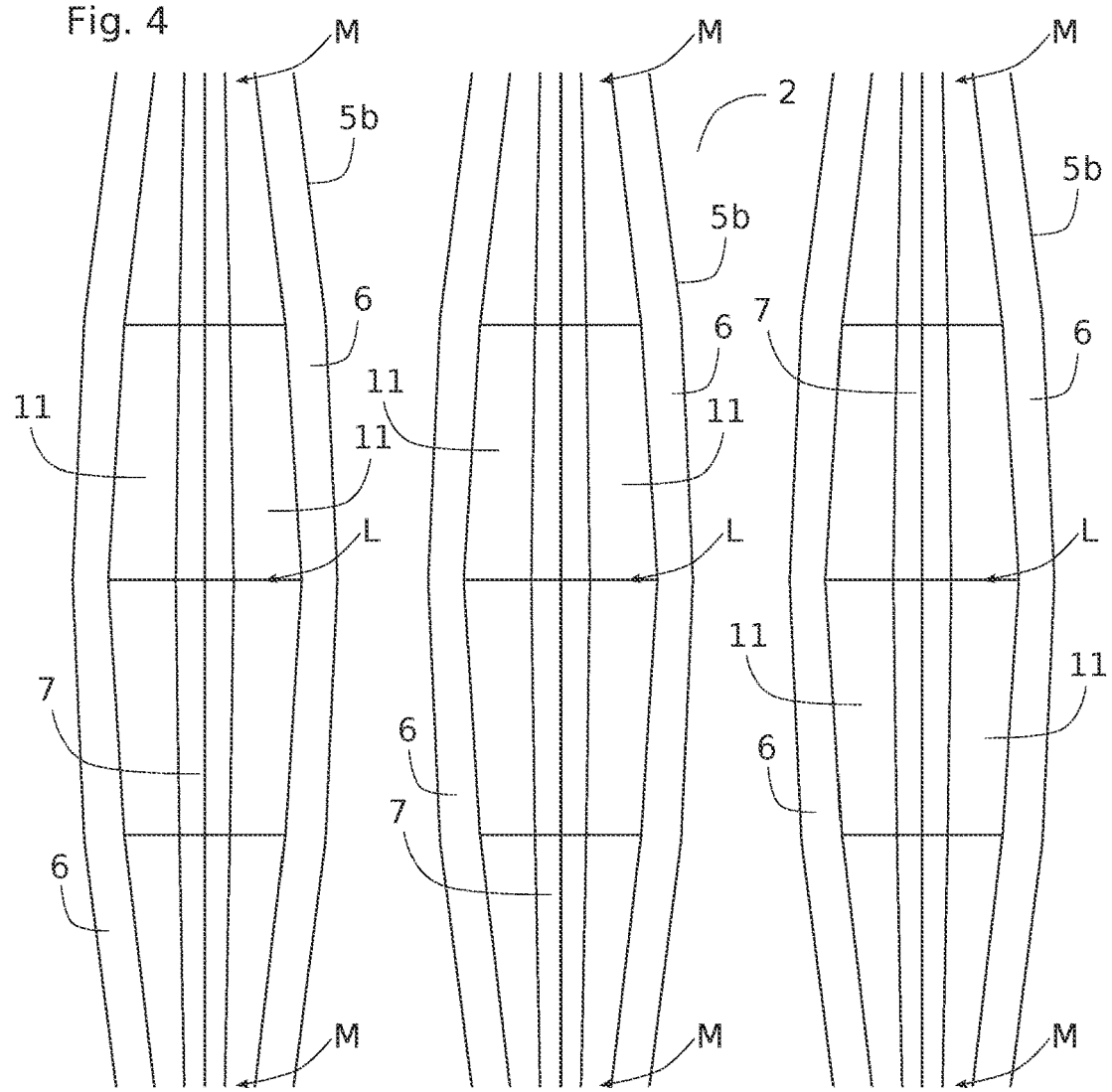

AIRCRAFT PRESSURIZED CABIN DOOR WITH A STRUCTURE FORMED BY BEAMS HAVING A VARYING CROSS-SECTION

CROSS REFERENCE TO RELATED APPLICATION

This application is a national stage entry of PCT/EP2020/083831 filed Nov. 30, 2020, under the International Convention and claiming priority over French Patent Application No. FR1913588 filed Dec. 2, 2019.

TECHNICAL FIELD

The invention relates to the field of aeronautics and relates to a pressurized aircraft cabin door.

Aircraft, and airplanes in particular, are usually equipped with doors that allow people and equipment into and out of the cabin. Since the cabin is pressurized, these doors must ensure that, during the flight, the cabin remains closed and a significant pressure difference is maintained between the interior of the cabin and the outside. Pressurized cabin doors therefore include an exterior panel, also called "skin", which, when the door is closed, is flush with the fuselage of the aircraft and which acts as a barrier to maintain the pressure difference. So that this exterior panel can have an acceptable thickness despite the significant stresses due to the pressure difference, the door also comprises a door structure formed of beams attached to the exterior panel to ensure the rigidity of the latter.

In addition, cabin doors also generally support various equipment such as door opening mechanisms or comfort and safety equipment. The door structure, in addition to ensuring the rigidity of the door, must also be dimensioned to support these additional masses.

Pressurized cabin doors are critical for aircraft safety, as they are responsible for maintaining the pressure inside the cabin. The door panels and the associated door structures are therefore dimensioned for a high level of safety. However, the mass of the door structure, and of the door in general, benefits from being reduced for reasons of production cost and lightness of the aircraft, in particular to allow fuel savings.

PRIOR ART

The patent application FR2928620 describes an airplane cabin door whose door structure comprises intersecting transverse beams and stringers that form a rigid structure. The transverse beams and stringers are IPN-type sections. In the example described by this document, four stringers and six transverse beams intersect at right angles and are attached to each other, thus forming a highly rigid structure.

Such a door structure is difficult and expensive to manufacture, in particular because of the connections that are to be made at the intersections between the stringers and the transverse beams. These connections require fasteners, additional parts or complex connections, and also lead to increases in mass.

Furthermore, the intersections between the transverse beams and the stringers make it difficult to manufacture this door using composite materials, for which the creation of such intersections generates more difficulties in terms of assembly or molding.

The patent application US2007007390 proposes solving some of the abovementioned drawbacks by proposing a monolithic airplane door made in one piece. Strong reinforcing ribs intersect at right angles over the entire inner surface of the door. Such a door is also highly rigid, which is appropriate for its use in aeronautics, but remains highly complex and costly to produce. Its mass is also substantial.

Patent application US2009/0078826 describes a pressurized cabin door made of composite materials and whose design is optimized for the use of these composite materials. The door comprises beams that are arranged at right angles to each other but do not intersect. The method of manufacturing such a door is simplified compared to the abovementioned methods and the production using composite materials is facilitated. However, the skin support of such a door is lower than that of crossed-beam door structures.

SUMMARY OF THE INVENTION

The invention aims to improve pressurized aircraft cabin doors, by proposing such a door which combines high rigidity allowing its use for aircraft flying at altitude with simplicity of construction which allows rapid manufacture at lower cost, by any process and materials, including composite materials.

To that end, the invention relates to a pressurized aircraft cabin door, comprising an exterior panel and a door structure. The door structure includes:

two circumferential beams attached to the side edges of the door;

a plurality of longitudinal beams arranged substantially perpendicularly to the circumferential beams and attached to the exterior panel, each longitudinal beam extending from one circumferential beam to the other, and each longitudinal beam comprising: a first end coming into contact with one of the circumferential beams; and a second end which comes into contact with the other circumferential beam.

In addition, each longitudinal beam has an open cross section whose opening faces the exterior panel, this opening being closed by the inner face of the exterior panel on which the longitudinal beam is attached, at least one longitudinal beam having a variable cross-section, in two directions perpendicular to the direction in which the longitudinal beam extends, a cross section that increases from the ends of the beam towards the middle of the beam, the longitudinal beam with a variable cross-section having two support bars attached to the exterior panel, these support bars extending over the entire length of the longitudinal beam, on either side of said opening, these two support bars being curved and each having a concavity facing the concavity of the other support bar.

In the present description and in the claims, the adjective "longitudinal" refers to the longitudinal direction of the fuselage of the aircraft. The longitudinal beams are therefore beams extending over the door parallel to the longitudinal axis in which the fuselage of the aircraft extends. Similarly, the adjective "circumferential" refers to the circumference of the aircraft fuselage. The circumferential beams are therefore beams which extend along a circle relative to a cross section of the fuselage of the aircraft. Similarly, the inner face of the exterior panel refers to the face that is on the side of the cabin, as opposed to the outer face of the exterior panel which faces outwards.

In the present description and in the claims, the notion of cross section of the longitudinal beam is defined precisely as the area of a surface which is delimited by the contours of the beam, in a cross-sectional plane perpendicular to the direction in which the beam extends. For example, if the longitudinal beam consists of a section which is a cylinder with a trapezoidal base, the cross section of the beam at a given point is the area of the trapezium in the cross-sectional plane at this point.

Such a door has a high rigidity without resorting to intersecting beams. Beams that are arranged transversely to each other come into contact, with the ends of one beam against the side of another beam, without intersecting. The junctions between beams are thus simplified and the assembly of previously produced beams is simplified. This arrangement is particularly suitable for the production using composite materials.

The invention also makes it possible to use various manufacturing techniques, as different materials and processing techniques can be used for the same door. The simplicity of the design makes it possible to efficiently implement the majority of the techniques used in aeronautical construction, and such a door can be produced by technologies which would be too complex to be considered with a crossed-beam structure. The shape of the variable-section beams, in particular, can be demoulded and easily produced using composite materials.

Despite its simplicity of assembly, the door has great rigidity, allowing the exterior panel to maintain significant pressure differences between the interior and exterior of the cabin.

Each of the longitudinal beams has two support lines, on either side of the opening of its profile, for attaching the exterior panel. A longitudinal beam provides two holding regions, that are parallel and spaced-apart, for the entire width of the exterior panel.

Furthermore, the fact that at least one longitudinal beam has, in two perpendicular directions, a cross section that increases from the ends of the beam towards the middle of the beam, provides this structure with a non-constant cross section providing reinforcement of the support of the exterior panel. The inventors have in fact determined that such a continuous increase in the cross section of the beam makes it possible to very significantly reduce the blisters that form at altitude on the exterior panel under the effect of the pressurization of the cabin. These blistering phenomena generally lead to an increase in the thickness of the exterior panel in order to reduce the depth of the blisters and thus not to penalise the aerodynamic drag of the aircraft. Instead, the invention makes it possible to reduce the thickness of the exterior panel while improving the stiffness of the exterior panel and reducing its propensity to develop blisters. This results in a lower cost and lighter door, and therefore helps to save fuel for the aircraft.

The aircraft door according to the invention may have the following additional features, taken alone or in combination:
the longitudinal beam with a variable cross-section comprises two side flanges extending obliquely towards each other from the two support bars, these two side flanges being curved and each having a concavity facing the concavity of the other side flange;
each support bar is formed by a fold in of the side flanges;
the longitudinal beam with a variable cross-section comprises a top flange, opposite the support bars, the width of which, measured in a plane perpendicular to the longitudinal axis of the beam, is less than or equal to the minimum distance separating the two support bars;
the top flange is a curved surface with the concavity facing the exterior panel;
the door structure comprises a frame formed of the circumferential beams and two longitudinal beams located at the ends of the circumferential beams;
the longitudinal beam with a variable cross-section has a dimension that increases from the ends of the beam towards the middle of the beam, in the two directions perpendicular to the direction in which the longitudinal beam extends.

BRIEF DESCRIPTION OF THE DRAWINGS

Other features and advantages of the invention will emerge from the nonlimiting description which follows, with reference to the appended drawings in which:
FIG. 1 shows an aircraft door according to the invention, seen in perspective;
FIG. 2 shows the door of FIG. 1, shown in profile and in section;
FIG. 3 shows in perspective beams of non-constant cross section of the door of FIG. 1;
FIG. 4 shows the beams of FIG. 3 seen from above.

DETAILED DESCRIPTION OF THE INVENTION

Figure 5:
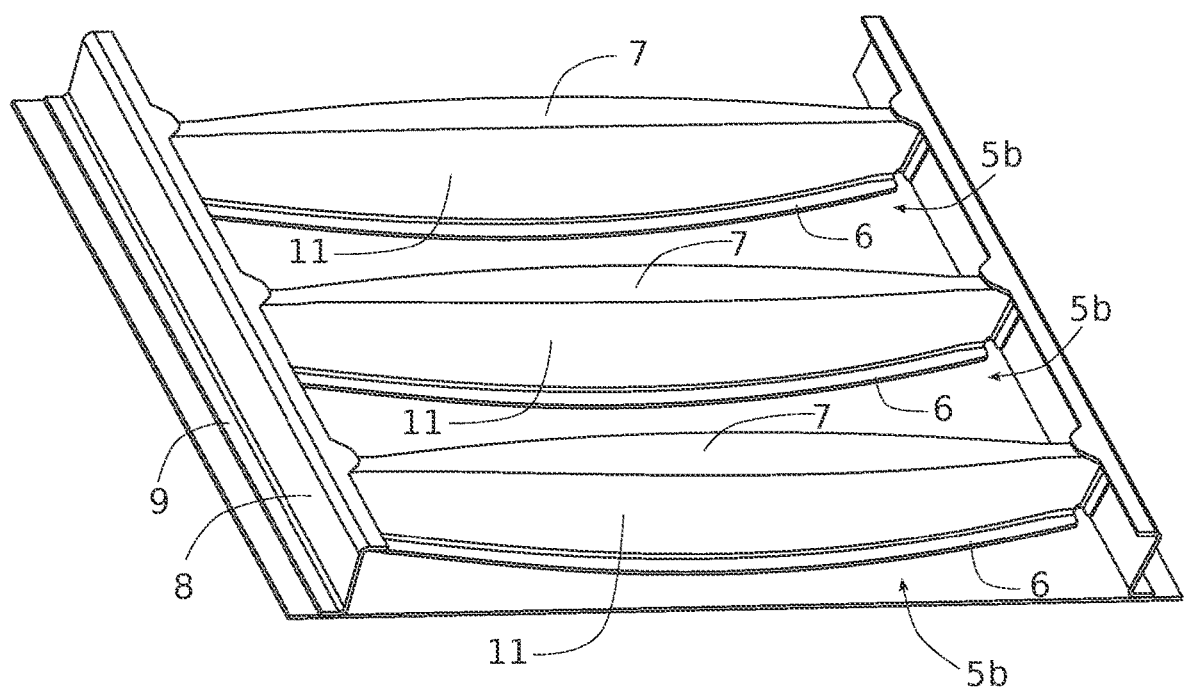
FIG. 5 is similar to FIG. 3 for an alternative embodiment.

FIG. 1 shows in perspective a door 1 of a pressurized aircraft cabin. In the present example, this door 1 is intended to close a corresponding opening created in the fuselage of an airplane. The door 1 can be opened when the airplane is on the ground to allow passengers to enter and leave, to constitute an emergency exit, an access hatch to the holds, or any other opening panel for an airplane. The cabin door 1 is conventionally associated with hinge mechanisms, opening and closing controls, as well as sealing and safety devices (not shown).

The cabin door 1 comprises an exterior panel 2 and a door structure 3 which strengthens the exterior panel 2. When the cabin door 1 is closed, the exterior panel 2 constitutes the outer surface of the airplane in the extension of the fuselage. The exterior panel 2 can for example be made from an aluminium sheet that is 2 to 5 millimeters thick. In the present example, the exterior panel 2 has a curvature (see FIG. 2) which follows the shape of the fuselage of the airplane, the cross section of which is generally substantially circular or with a double curvature.

The door structure 3 is attached to the inner part of the exterior panel 2, which is the side at the interior of the airplane cabin. The door structure 3 comprises two circumferential beams 4 attached to the exterior panel 2 on the side edges of the door 1. The circumferential beams 4 follow the circumferential curvature of the exterior panel 2, and more generally of the airplane fuselage. In the example described, the circumferential beams 4 are vertical beams (with reference to the position shown in FIG. 1), each being attached close to a side edge of the exterior panel 2.

The door structure 3 also comprises a plurality of longitudinal beams 5a, 5b which extend in the longitudinal direction of the airplane fuselage, that is to say, with reference to the position of FIG. 1, substantially horizontally. Each longitudinal beam 5a, 5b has a first end that comes into contact with one of the circumferential beams 4, and has a second end which comes into contact with the other circumferential beam 4. Each longitudinal beam 5a, 5b thus extends perpendicularly to the circumferential beams 4, from one circumferential beam 4 to the other. Alternatively, each longitudinal beam 5a, 5b simply extends transversely to the circumferential beams 4 because, in some cases, the door 1 is mounted in areas of changing geometry, where the longitudinal beams are not perpendicular to the circumferential beams.

The longitudinal beams 5a, 5b are sections each having two support bars 6 which are attached to the exterior panel 2 along the entire length of the corresponding longitudinal beam 5a, 5b. Each of the longitudinal beams 5a, 5b has a top flange 7, opposite the support bars 6. For each beam 5a, 5b, the top flange 7 is joined to the support bars by means of side flanges 11.

The circumferential beams 4 each have a web 8 consisting of a single flange extending perpendicular to the surface of the exterior panel 2. Each circumferential beam 4 further comprises an attaching flange 9, for attaching it to the exterior panel 2, and a reinforcing rim 10 which can be attached to the top flange 7 of each longitudinal beam 5a, 5b which comes into contact with the circumferential beam 4 in question.

The attaching flange 9 and the reinforcing rim 10 can consist of plies of the web of the circumferential beam 4.

The two circumferential beams 4 and the two longitudinal beams 5a at the upper end and at the lower end of the door 1 constitute a frame of the door structure 3. Each of the ends of the web 8 of the circumferential beams 4 is attached to the longitudinal beam 5a at the corresponding end.

FIG. 2 is a vertical section through the door 1 of FIG. 1, and shows the profile of the longitudinal beams 5a, 5b as well as their arrangement with respect to the exterior panel 2. Each longitudinal beam 5a, 5b is attached to the exterior panel 2 by its two support bars 6.

Attaching the support bars 6 to the exterior panel 2 closes the opening of the longitudinal beam 5a, 5b, so that the latter constitutes a hollow shape with a closed profile.

In the example of FIGS. 1 and 2, the door 1 comprises two types of longitudinal beams: beams of constant cross section 5a and particular beams 5b which are said to be "of variable cross section".

The longitudinal beams 5a of constant cross section are open trapezoidal sections whose opening faces the exterior panel 2. In other words, these beams 5a are cylinders whose directrix line is a trapezoidal shape which is open at the long side of the trapezium. The opening of the beams 5a is closed by the inner face of the exterior panel 2 on which the corresponding longitudinal beam 5a is attached.

The longitudinal beams 5a of constant cross section have flat side flanges 11 and top flanges 7 that are also flat.

The longitudinal beams 5b of variable cross section have the same cross-sectional shape as the beams 5a of constant cross section, and their opening also faces the exterior panel 2. The longitudinal beams 5b of variable cross section are therefore open trapezoidal sections whose opening faces the exterior panel 2. In other words, these beams 5b are cylinders whose directrix line is a trapezoidal shape which is open at the long side of the trapezium. The opening of the beams 5b is closed by the internal face of the exterior panel 2 to which the corresponding longitudinal beam 5b is attached, so that the interior of the beam 5b is not accessible. However, for beams 5b, this cross-section changes along the beam. The cross section of the beams 5b increases towards the middle of the beam. The cross section 5b is said to be "increasing" because a cross section of this beam 5b near the middle of the beam has a greater area than that of a cross section of the beam near the ends of the beam. In other words, the shape which is delimited by the contour of the beam 5b, in a cross-sectional plane perpendicular to the direction in which the beam 5b extends (in this example, a trapezoid), has a larger area in a plane of cross section located towards the middle of the beam than in a plane of cross section located towards the ends of the beam.

More precisely:

the top flange 7 is curved towards the middle of the beam, that is to say that the height of the top flange 7 (relative to the exterior panel 2) is greater in the middle of the beam than at the ends of the beam;

the side flanges 11 are also curved towards the middle of the beam, that is to say that the separation between two side flanges 11 of a given beam 5b is greater in the middle of the beam than at its ends.

Despite the curved nature of the top flange 7, the longitudinal beam 5b interfaces effectively with the circumferential beams 4 by providing a flat surface portion at the ends of the beam 5b for attaching the reinforcing rim 10 of the circumferential beams 4 on the longitudinal beam 5b.

FIG. 3 is a partial representation of a door 1 such as the door of FIGS. 1 and 2, in a variant where this door 1 comprises three longitudinal beams 5b of variable cross section. Only a portion of the exterior panel 2 has been represented, and the other elements of the door have not been represented, in order to show only the longitudinal beams 5b of variable cross section in perspective.

Each top flange 7 of the beams 5b has a top region H which is the highest point of the beam 5b, and two low regions B at each of the ends of the beam 5b, which are the lowest points of the beam 5b. These regions are termed top (high) region and low region with reference to the distance separating the top flange 7 from the exterior panel 2. Thus, the region H of a beam 5b is located at a maximum distance from the exterior panel 2 while the two regions B are located at a minimum distance from the exterior panel 2. Between each of the low regions B and crown regions H, the top flange 7 extends obliquely away from the exterior panel 2.

The beam 5b thus has a dimension that increases from the ends of the beam towards the middle of the beam, along a direction Y which is perpendicular to the exterior panel 2, that is to say that the beam has a variation of the distance between the top flange 7 and the exterior panel 2, for different positions along the beam 5b. The beam 5b also has a dimension that increases from the ends of the beam towards the middle of the beam, along a direction Z which is perpendicular to the Y direction, that is to say that the beam has a variation of the distance between its two side flanges 11, for different positions along the beam 5b.

FIG. 4 is a top view of the beams 5b of FIG. 3 and illustrates the rounded character of the side flanges 11.

The variation in cross section of the beams 5b in the Z direction results in a curved shape (see FIG. 4) of the support bars 6. The side flanges 11 have a top region L in the middle of the beam, for which the separation between the two side flanges 11 is at a maximum, as well as two narrowing regions M, in which the separation between the two side flanges 11 is at a minimum. Between the regions M of minimum width and the regions L of maximum width, the side flanges 11 diverge from each end of the beam in the direction of the middle of the beam corresponding to the region L.

The cross-sectional variation of the beams 5b can be carried out segment by segment, as illustrated in FIGS. 3 and 4, or in a continuous and regular manner.

Each longitudinal beam 5b of variable cross section thus has a maximum cross section in the middle of the beam, corresponding to:

a maximum distance, in the Y direction, between the exterior panel 2 and the top flange 7;

a maximum separation, in the Z direction, between the two side flanges 11.

From this region of maximum cross section, each beam 5b sees its cross section decrease as one moves away from the middle of the beam to end up with a minimum cross section in the two perpendicular directions Y, Z at each of the ends of the beam.

The phenomenon of blistering due to the pressurization of the cabin is thus avoided and the longitudinal beams 5b of variable cross section can be arranged at any place of the aircraft door which would be subjected to phenomena of blistering as a result for example of a reduction in the weight of the door structure 3 or a reduction in the thickness of the exterior panel 2.

Alternative embodiments of the aircraft door can be implemented without departing from the scope of the invention. In particular, all the longitudinal beams of an aircraft door can consist of beams 5b of variable cross section.

In the present example, for beams of variable cross section, the area of greatest cross section is approximately twice the end cross sections of the beam. Other beam cross section variation ratios can be implemented to fit a particular aircraft door arrangement or arrangement of materials. In addition, the variable cross section can be implemented in conjunction with a change in profile of the cross section. For example, the top flange 7 may be flat at the ends of the beam and its profile may vary towards a half-round profile going towards the area of greatest cross section.

In the example relating to FIGS. 3 and 4, the beams 5b of variable cross section have a prismatic shape, the change in the cross section being brought about by means of flat surfaces. FIG. 5 illustrates a variant in which, as in FIG. 1, the variation in cross section of the beams 5b of variable cross section can be achieved by means of curved surfaces. According to this variant, the lengthwise change in the characteristics of the cross section is not linear, and as a result the top flanges 7 and the side flanges 11 have shapes which are not flat.

The invention claimed is:

1. An aircraft pressurized cabin door comprising:
   an exterior panel (2); and
   a door structure (3) which comprises:
   two circumferential beams (4) attached to the side edges of the door;
   a plurality of longitudinal beams (5a, 5b) arranged perpendicularly to the circumferential beams (4) and attached to the exterior panel (2), each longitudinal beam (5a, 5b) extending from one circumferential beam (4) to the other, and each longitudinal beam (5a, 5b) comprising: a first end coming into contact with one of the circumferential beams (4); and a second end which comes into contact with the other circumferential beam (4);
   wherein each longitudinal beam (5a, 5b) has an open cross-section whose opening faces the exterior panel (2), the opening being closed by the inner face of the exterior panel (2) on which the longitudinal beam (5a, 5b) is attached, at least one longitudinal beam (5b) having a variable cross-section, in two directions (Y, Z) perpendicular to the direction in which the longitudinal beam (5b) extends, a cross: section that increases continuously from the ends (B, M) of the beam towards the middle (H, L) of the beam, the variable cross-section longitudinal beam (5b) having two support bars (6) attached to the exterior panel (2), the support bars (6) extending over the entire length of the longitudinal beam (5b), on either side of said opening, the two support bars being curved and each having a concavity facing the concavity of the other support bar (6).

2. The door as claimed in claim 1, wherein the variable cross: section longitudinal beam (5b) comprises two side flanges (11) extending obliquely towards each other from the two support bars (6), the two side flanges (11) being curved and each having a concavity facing the concavity of the other side flange (11).

3. The door as claimed in claim 2, wherein each support bar (6) is formed by a fold of one of the side flanges (11).

4. The door as claimed in claim 1, wherein the variable cross: section longitudinal beam (5b) comprises a top flange (7), opposite the support bars (6), the width of which, measured in a plane perpendicular to the longitudinal axis of the beam (5b), is less than or equal to the minimum distance separating the two support bars (6).

5. The door as claimed in claim 4, wherein the top flange (7) is a curved surface with the concavity facing the exterior panel (2).

6. The door as claimed in claim 1, wherein the door structure (3) comprises a frame formed by the circumferential beams (4) and two longitudinal beams (5a, 5b) located at the ends of the circumferential beams (4).

7. The door as claimed in claim 1, wherein the variable cross: section longitudinal beam (5b) has a dimension which increases from the ends (B, M) of the beam towards the middle (H, L) of the beam, in the two directions (Y, Z) perpendicular to the direction in which the longitudinal beam (5b) extends.

* * * * *